United States Patent [19]

Goebel

[11] Patent Number: 4,588,011

[45] Date of Patent: May 13, 1986

[54] TIRE-DEMOUNTING DEVICE

[76] Inventor: Eickhart Goebel, Elbestrasse 11, D-6102 Pfungstadt, Fed. Rep. of Germany

[21] Appl. No.: 697,229

[22] Filed: Feb. 1, 1985

[30] Foreign Application Priority Data

Feb. 4, 1984 [DE] Fed. Rep. of Germany ....... 3403971

[51] Int. Cl.4 ............................................. B60C 25/06
[52] U.S. Cl. .................................................. 157/1.17
[58] Field of Search ....................... 157/1.17; 254/131

[56] References Cited

U.S. PATENT DOCUMENTS 3,198,362  8/1965  Berg ................................ 254/131 X
3,693,692  9/1972  Branick .............................. 157/1.17
4,462,451  7/1984  Ogren ................................. 157/1.17

Primary Examiner—James G. Smith

[57] ABSTRACT

The invention relates to a tire-demounting device with two bead-breaking elements pivoted on a holder that is placed upon the tire. The demounting device is in the form of a pair of pincers, with the bearing points of the bead-breaking elements being at different distances relative to the pivot of the pincers. With the pincers open, the first bead-breaking element exerts a force component which is substantially radial relative to the wheel and when further opened, the second bead-breaking element exerts a force component which is substantially axial relative to the wheel.

10 Claims, 6 Drawing Figures

TIRE-DEMOUNTING DEVICE

BACKGROUND OF THE INVENTION

The invention relates generally to manual tire-demounting devices.

DESCRIPTION OF PRIOR ART

The "Gummibereifung" magazine, 60th year, January 1984, pages 62–65, features a new tire/rim assembly where the tire is seated on the radial inner side of the rim. This means that the tire extends over the rim and is located behind the rim flanges, which are bent radially inwards. Conventional tire-mounting machines are not suited to demount a tire from this type of new tire/rim assembly. Because this new tire/rim assembly is becoming more widely accepted, there is a need for a device for demounting the tire from the rim. The present invention is directed toward filling that need.

SUMMARY OF THE INVENTION

It is a primary object of the present invention to provide for a tire-demounting machine for quickly demounting a tire from a rim, where the tire is seated on the radial inner side of the rim.

The present invention is directed to a tire-demounting apparatus for demounting a tire from a rim in a tire/rim assembly where the bead of the tire extends over the rim and is located behind the rim flanges which are bent radially inwards.

The apparatus basically comprises a pair of pincers in the form of first and second elongated arms joined at one end by a pincer pivot. A first bead-breaking element also is pivotally mounted near the pincer pivot. A second bead-breaking element also is pivotally mounted near the pincer pivot. The first and second bead-breaking elements are mounted through first and second pivots. The first and second pivots are at different distances from the pincer pivot so that, when the first arm is pivoted relative to the second arm, the first bead-breaking element exerts a force component on the bead of the tire which is substantially radial relative to the tire. In like manner, the second bead-breaking element exerts a force component which is substantially axial relative to the tire. Through continued movement of the first arm relative to the second arm and the forces exerted by the first and second bead-breaking elements, the tire may be removed from the rim.

Because the bead-breaking elements are pivoted on the upper lever at different distances relative to the pivot of the pincers, the tire bead is first pulled radially inwards by means of one bead-breaking element and then axially over the rim flange by means of the second bead-breaking element. As one of the bead-breaking elements is fork shaped, the other can be applied to the tire bead in between the two prongs of the first one.

BRIEF DESCRIPTION OF THE DRAWINGS

The preferred embodiment of the invention is illustrated in the accompanying drawings, in which.

DESCRIPTION OF THE PREFERRED EMBODIMENT

Figure 1:
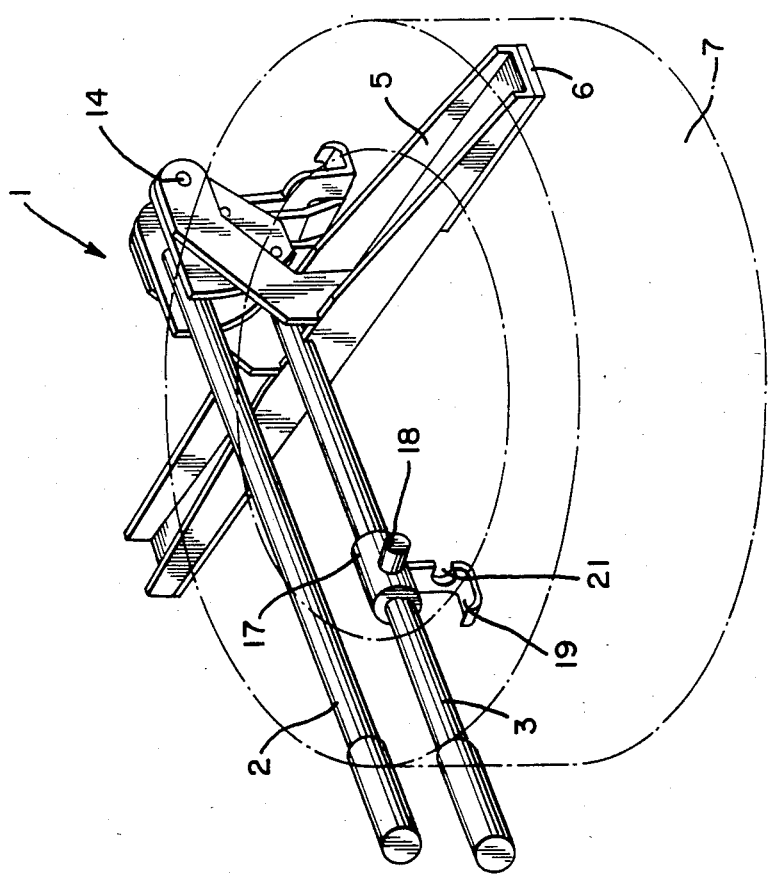
FIG. 1 is a perspective view of an embodiment of the demounting device incorporating the teachings of the present invention and showing a tire in phantom.

In describing the preferred embodiment of the invention illustrated in the drawings, specific terminology will be resorted to for the sake of clarity; however, it is not intended that the invention be limited to the specific terms so selected, and it is to be understood that each specific term includes all technical equivalents which operate in a similar manner to accomplish a similar purpose.

The demounting device basically comprises a pair of pincers 1 terminating in two elongated lever arms 2 and 3 which are connected with each other by pivot 4. A holder 5 is provided on the lower lever arm 3 preferably at right angles to the arm. This holder 5 can be an elongated member of a length greater than the largest wheel diameter to be handled. In addition, the holder 5 may be U-shaped when viewed in transverse cross section. Linings 6 are provided at the extremities of the holder 5 in order to increase friction between the holder 5 and the surface of the tire 23.

Figure 2:
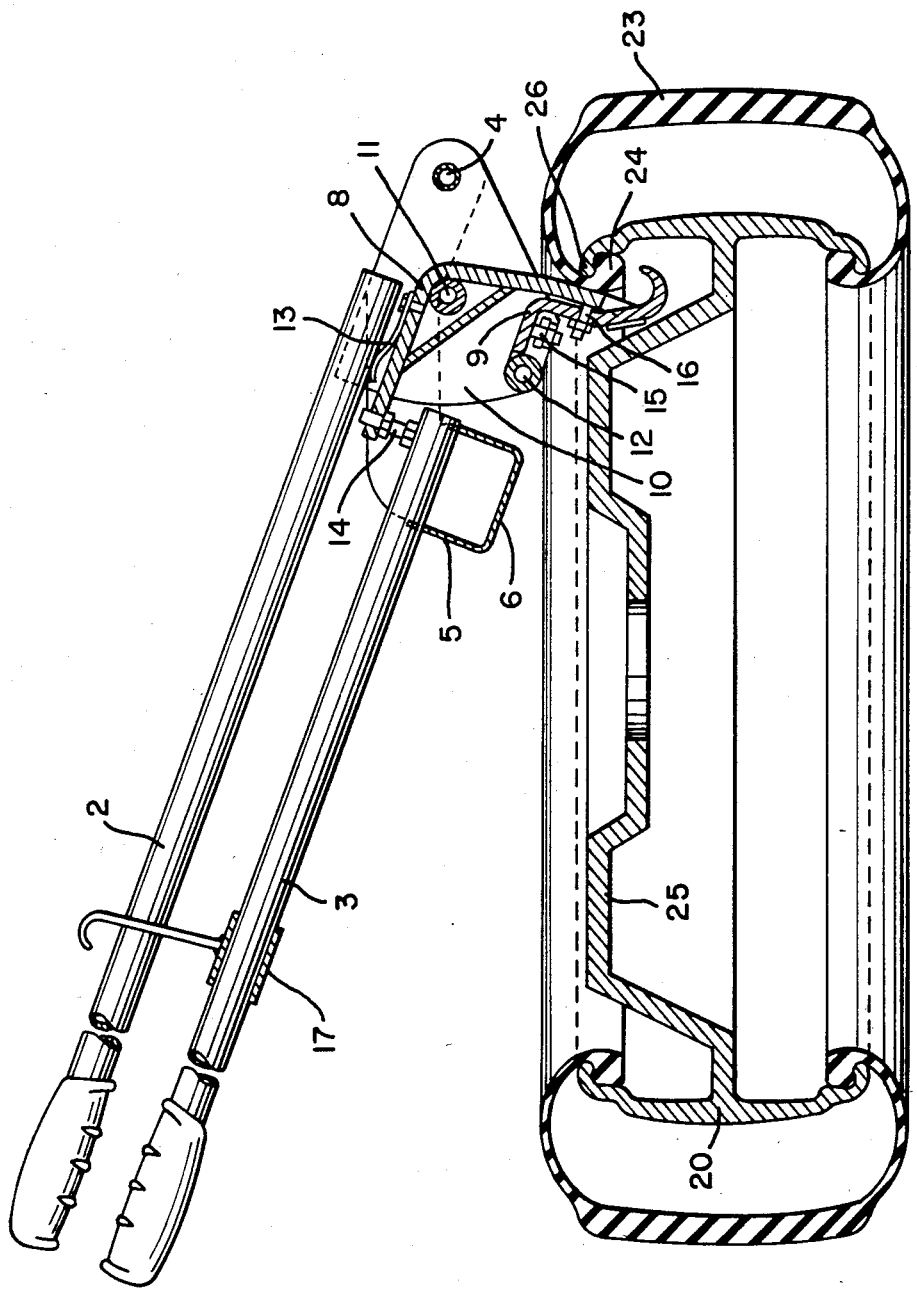
FIG. 2 is a side view, partly in section, showing application of the demounting device to a wheel including a rim and a tire.
Figure 6:
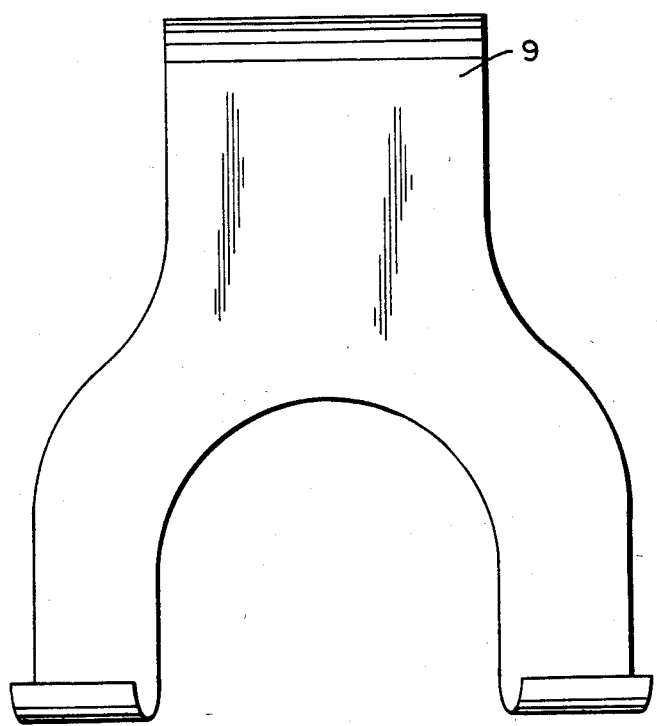
FIG. 6 is a front view of the second of the two bead breaking elements shown in FIGS. 1 through 5 as element 9, showing the embodiment wherein that element is fork shaped.

At the front of the upper lever 2 the bead-breaking elements 8 and 9 are pivoted preferably between two plates 10. With reference to FIG. 2, the pivots 11 and 12 of the bead-breaking elements 8 and 9, respectively, are at different distances from the pivot 4 of the pincers 1. The bead-breaking element 8 is preferably fork shaped so that the boot 33 of the bead-breaking element 9 can reach through the two prongs 31 and 32 of said first element 8. In another preferred embodiment (see FIG. 6) the bead-breaking element 9 may be fork shaped so that the bead-breaking element 8 can reach through the two prongs of said element 9.

If the distance between the rim ring and the rim disc of a tire/rim assembly is sufficiently great, the bead-breaking element 9 can be immovably secured to the lever 2 of the pincers 1 without presenting an impediment during the bead-breaking process.

The second bead-breaking element 8 has two legs, one of which has the form of a hook. the second leg 37 of said element 8 is supported through the stop 14 on the lower lever 3 of the pincers 1. Furthermore, there is a spring 13, preferably in the form of a leaf spring, between the upper side of the second leg 37 of said element 8 and the upper lever 2 of the pincers 1.

Figure 3:
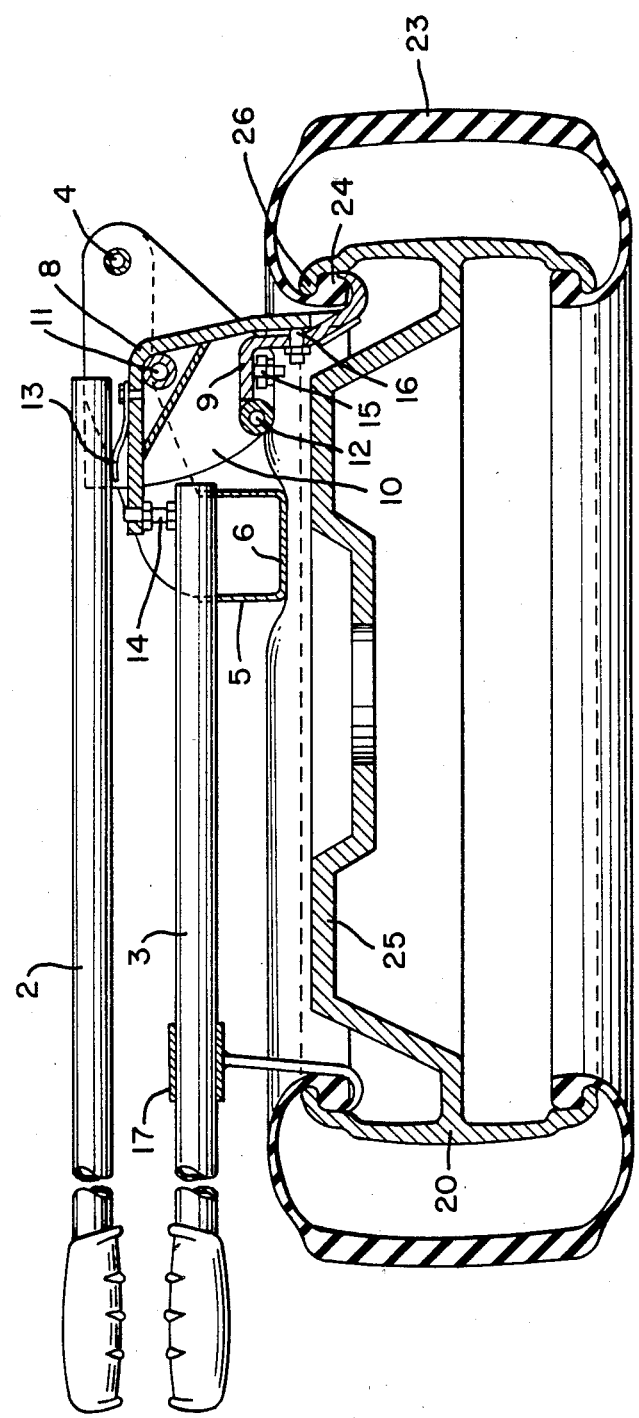
FIG. 3 is similar to FIG. 2 and illustrates the initial position of the demounting device for bead-breaking.

With reference to FIG. 3, a second stop 15 is provided on the plate 10 in order to guide the bead-breaking element 9 when the pincers are open or to locate the bead-breaking elements 8 and 9 in their initial positions in accordance with the movement of pincers 1. In addition an adjustable stop 16 is fitted between the bead-breaking elements 8 and 9 and secured to either of said elements 8 and 9.

The bead-breaking elements 8 and 9 can be well secured in the initial position of the pincers 1 with the stops 14, 15, and 16 adjusted accordingly. Furthermore, the bead-breaking element 9 may be provided with a spring 22 which presses element 9 against the other bead-breaking element 8, even during operation of the pincers 1, thus preventing free oscillation of element 9.

Another holder 17 is displaceably arranged at the rear end of the lower lever 3 of the pincers 1. Holder 17 is fixed to the lever 3 by suitable fastening means, for example, a screw 18. Holder 17 is provided with a hook 19 which is able to pass through the bead on the flange of the tire rim 20, thus counteracting any axial and radial forces. Both levers 2 and 3 of the pincers 1 can be connected with each other by the recess 21 in the holder 17 when the pincers 1 are in initial position. For this purpose the holder 17 has to be turned upwards by 180 degrees.

As illustrated in FIG. 2, which shows the initial position for demounting the tire 23 from the rim 20, the pincers 1 are applied to the wheel 7 such that the hooks 31, 32, and 33 of the bead-breaking elements 8 and 9 are inserted into the drop center of the rim 20 between the tire bead 24 and the disc 25 of the rim 20.

The pincers 1 are then moved downwards so that the holder 5 is supported on the tire 23, with the hooks of the bead-breaking elements 8 and 9 reaching down under and behind the tire bead 24. The second holder 17 is then adjusted and located such that the hook 19 is supported on the other side of the rim 20.

Figure 4:
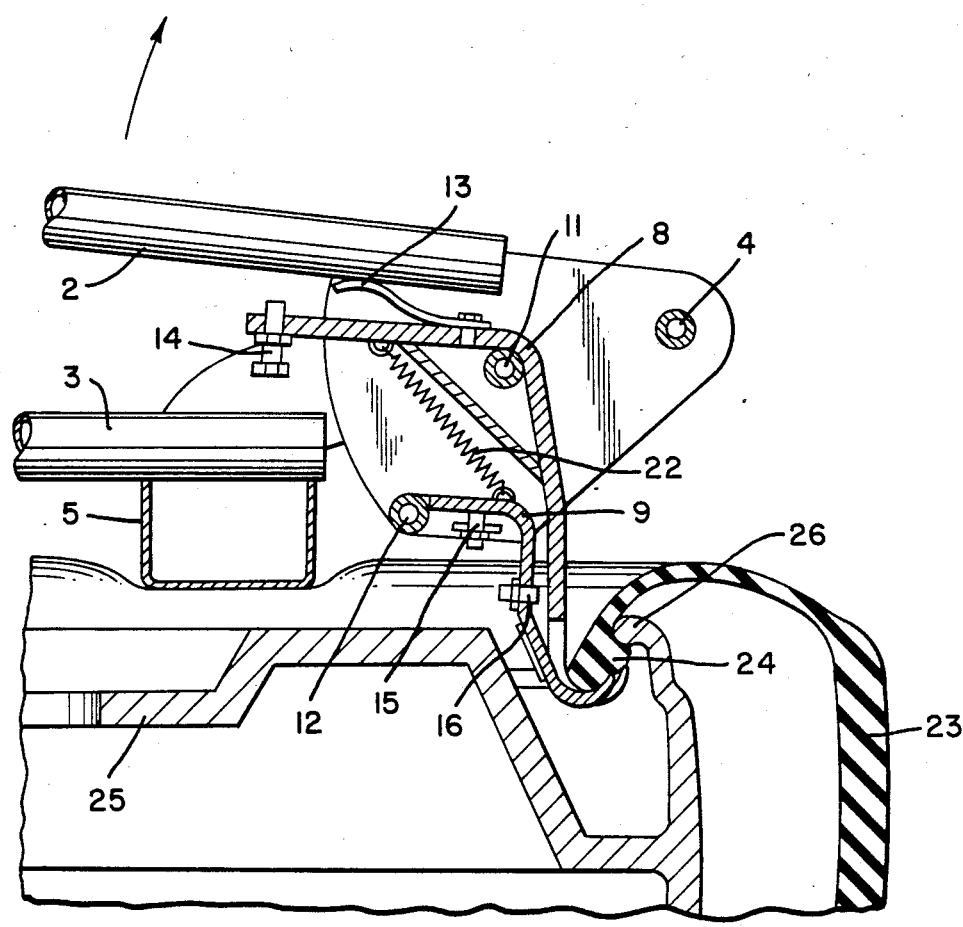
FIG. 4 is a side view, partly in section, of the demounting device during the first phase of the bead-breaking process.

When the pincers open as the upper lever 2 is moved upwards (see FIG. 4), the first bead-breaking element 9 moves substantially radially, but also axially, relative to the tire 23 as a result of the movement of the bearing point 12 about the pivot 4 of the pincers 1 so that consequently the hook 33 of the bead-breaking element 9 pulls the tire bead 24 inwards. The second bead-breaking element 8 is pressed by the spring 13 against the tire bead 24 so that the hooks 31 and 32 of said element 8 will reach at any rate behind the tire bead 24. The radial force component is counteracted in this case by the hook 19 of the holder 17 together with the fastening means 18 and/or the friction lining 6 of the holder 5.

Figure 5:
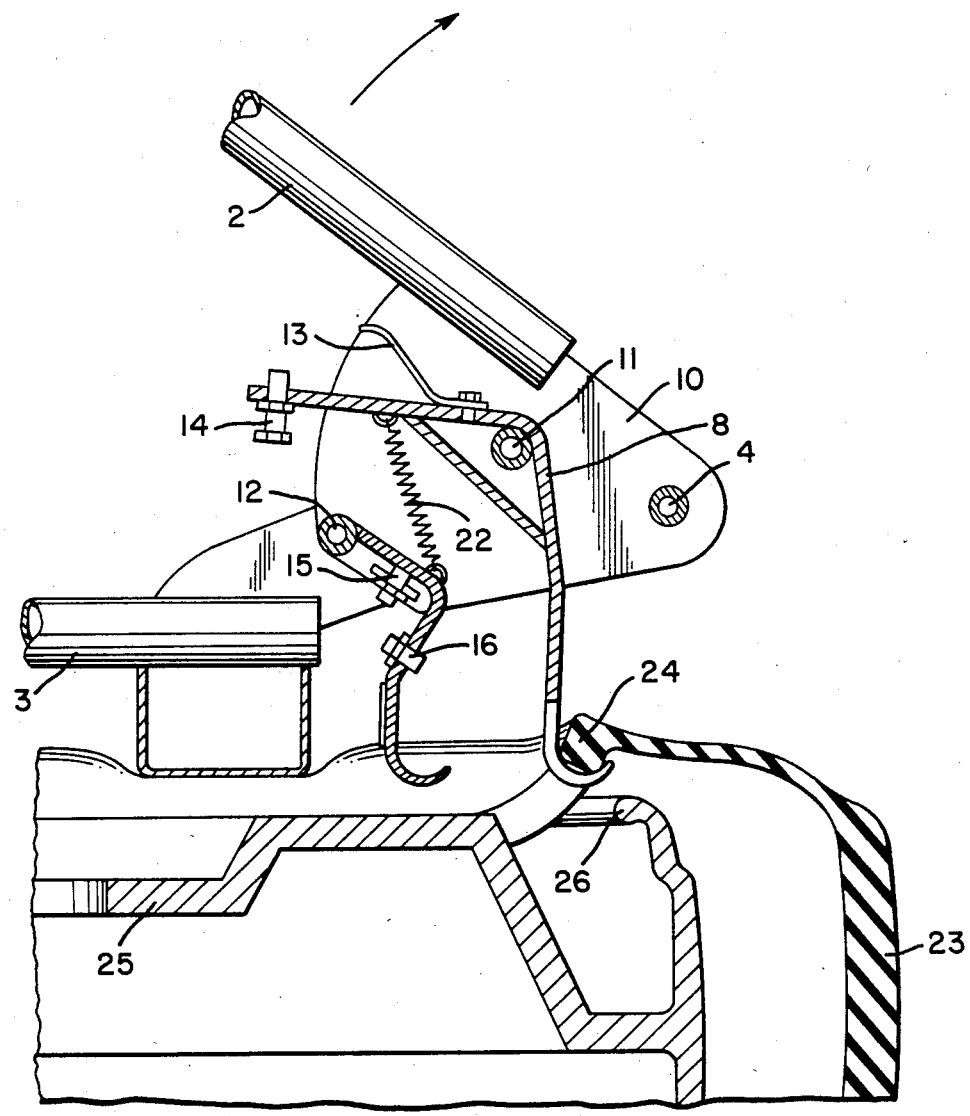
FIG. 5 is a side view, partly in section, of the demounting device during the final phase of the bead-breaking process.

As the pincers 1 continue opening, the second bead-breaking element 8 pulls the tire bead over the flange 26 of the rim 20 as illustrated in FIG. 5.

As soon as the tire 23 has been pulled over the rim flange 26 at any point, it can be demounted from the rim easily and completely without any effort.

Obviously, many modifications and variations of the present invention are possible in light of the above teachings. It is, therefore, to be understood that within the scope of the appended claims, the invention may be practiced otherwise than as specifically described.

What is claimed is:

1. A tire-demounting apparatus for demounting a tire from a rim in a tire/rim assembly where the beads of the tire extend over the rim and are located behind the rim flanges, which are bent radially inwards, said apparatus comprising:

first and second elongated arms each joined at one end by a pincer pivot to form a pair of pincers;
a first bead-breaking element pivotally mounted near said pincer pivot;
a second bead-breaking element pivotally mounted near said pincer pivot; and
first and second pivots for pivotally mounting said first and second bead-breaking elements, respectively, said first and second pivots being at different distances from said pincer pivot so that, when said first arm is pivoted relative to said second arm, said first bead-breaking element exerts a force component on one of the beads of said tire, said force being substantially radial relative to said tire, and said second bead-breaking element exerting a force component which is substantially axial relative to said tire.

2. Demounting device as set forth in claim 1, in which the extremity of one of said first and second bead-breaking elements is hook shaped.

3. Demounting device as set forth in claim 2, in which said first bead-breaking element is fork shaped at one extremity with two spaced prongs so that said second bead-breaking element can be applied to the tire bead in between said two prongs of the first element.

4. Demounting device as set forth in claim 2, in which said second bead-breaking element is fork shaped at one extremity with two spaced prongs so that said first bead-breaking element can be applied to the bead in between said two prongs of the first element.

5. Demounting device as set forth in claim 1, in which one of said first and second bead-breaking elements is immovably secured to one of said elongated arms of said pincers.

6. Demounting device as set forth in claim 1, in which an elongated holder is provided on one of said first and second elongated arms of the pincers at right angles relative to the latter.

7. Demounting device as set forth in claim 6, in which the side of the holder facing the tire is provided with a friction lining.

8. Demounting device as set forth in claim 1, in which a second holder is movably mounted on the same arm of said pincers as said elongated holder.

9. Demounting device as set forth in claim 1, in which a spring is provided between one bead-breaking element and one of said elongated arms of the pincers in order to exert an initial stress on said one bead-breaking element in the direction of the tire to be demounted.

10. Demounting device as set forth in claim 1, in which stops are provided on the first and second bead-breaking elements in order to place said first and second bead-breaking elements in their initial position of intended use.

* * * * *